United States Patent

Gardner

[15] 3,639,995
[45] Feb. 8, 1972

[54] DEVICE FOR MEASURING THE RING SIZE OF A FINGER

[72] Inventor: Irving Gardner, Hunter, N.Y. 12442
[22] Filed: Jan. 14, 1970
[21] Appl. No.: 2,885

[52] U.S. Cl. .................................33/179, 33/174 D, 33/139
[51] Int. Cl. ...........................................................G01b 3/10
[58] Field of Search..........................33/139, 140, 174 D, 179

[56] References Cited

UNITED STATES PATENTS

| | | | |
|---|---|---|---|
| 2,129,582 | 9/1938 | Johansson | 33/179 |
| 2,637,907 | 5/1953 | Aubrey | 33/179 |
| 537,082 | 4/1895 | Stuart | 33/139 |
| 2,271,725 | 2/1942 | Tunnicliff | 33/179 |
| 2,555,642 | 6/1951 | Hahus | 33/140 |

*Primary Examiner*—Leonard Forman
*Assistant Examiner*—Dennis A. Dearing
*Attorney*—Polachek & Saulsbury

[57] ABSTRACT

A device for measuring the size of a finger to determine the size of the ring that will fit the same. A disc is journaled in a casing formed of two parts. The disc carries a chain that is anchored on the exterior of the casing and on the disc within the casing so that the chain when pulled out of the casing is in the form of a loop through which a finger to be measured can be inserted. An arm carried on the disc has a pointed end exteriorly of the casing so that the size ring that will fit the finger is readily determined. When the chain links are not used for measuring they will readily retract into the casing by turning the disc.

7 Claims, 12 Drawing Figures

PATENTED FEB 8 1972 3,639,995
SHEET 1 OF 2
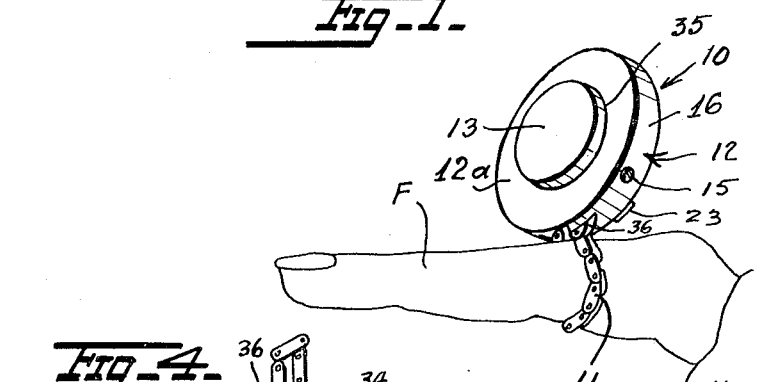
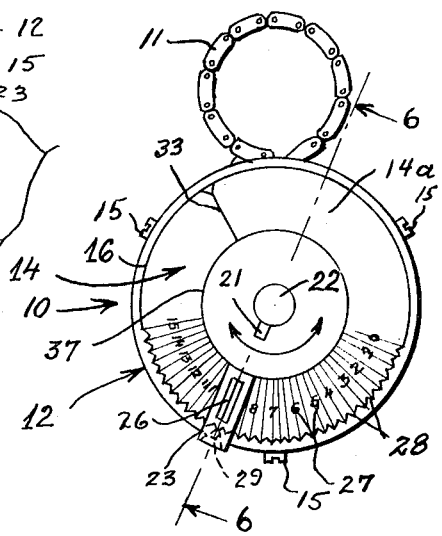
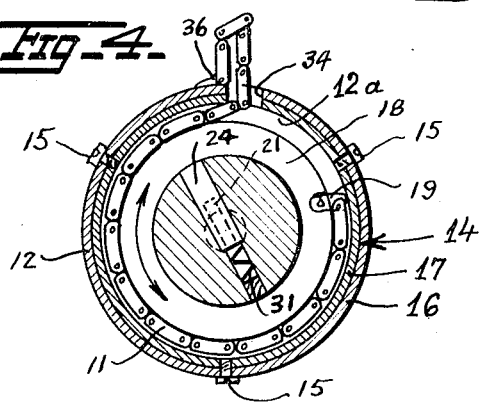
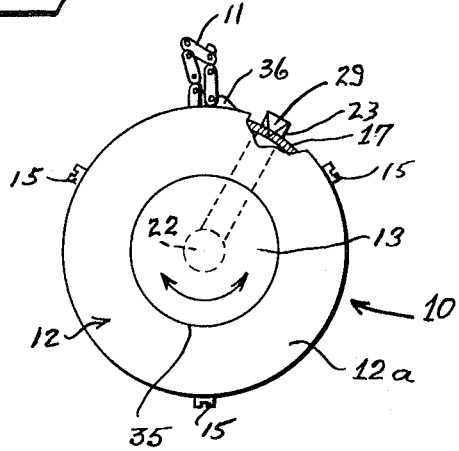
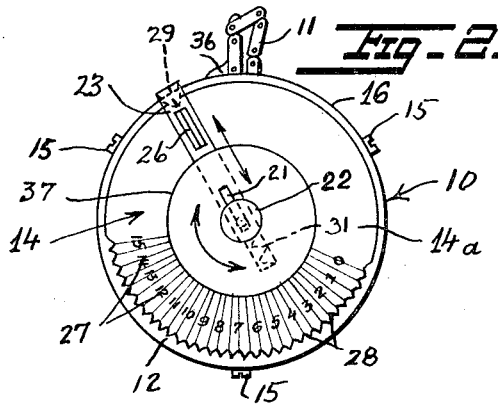
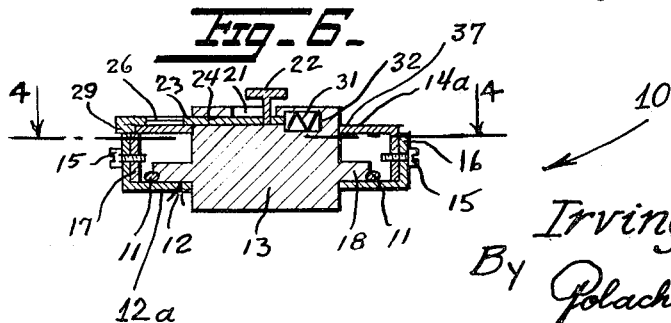
INVENTOR
Irving Gardner
By Polachek & Saulsbury
ATTORNEYS

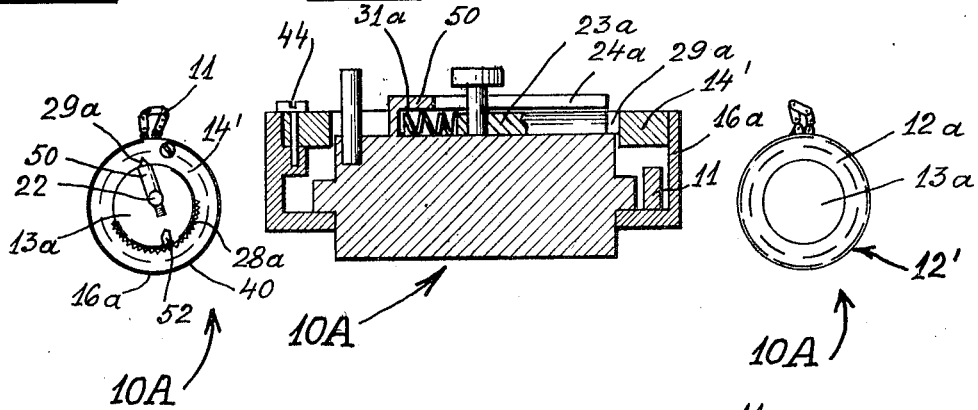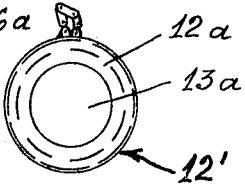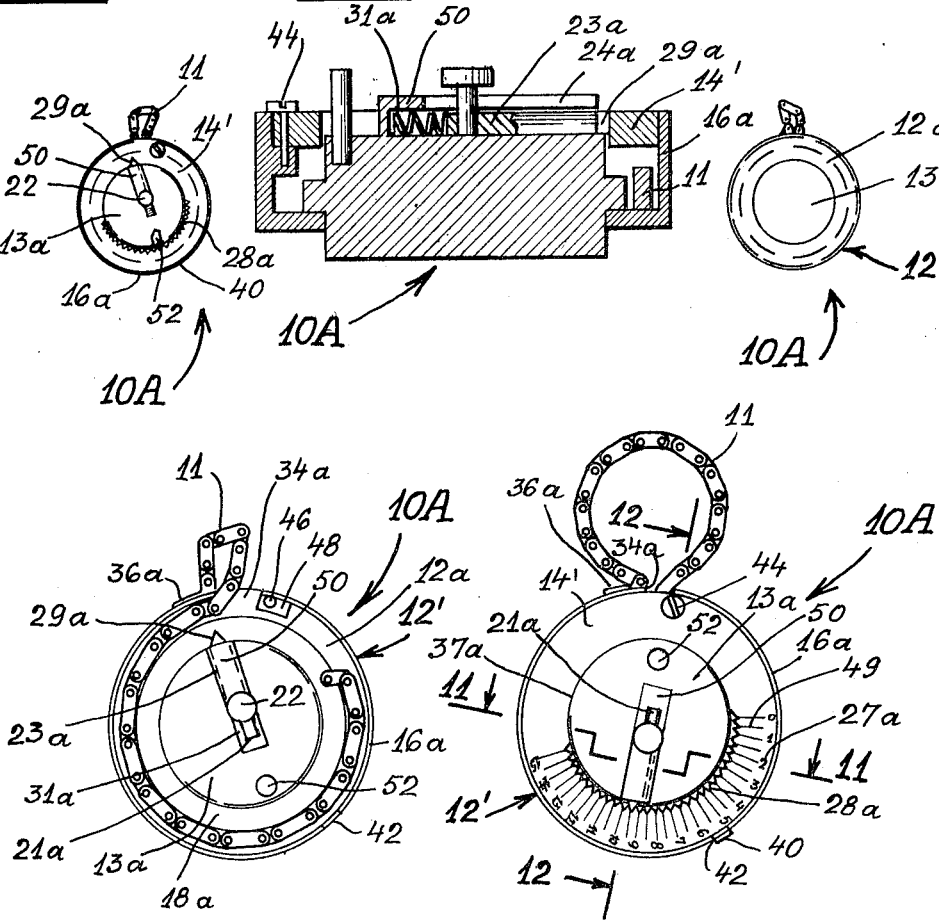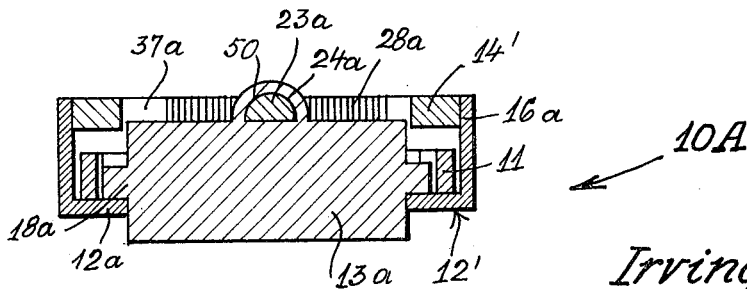

DEVICE FOR MEASURING THE RING SIZE OF A FINGER

This invention relates to a ring finger measuring device to determine the ring size of a ring therefor.

It is an object of the present invention to provide a finger ring measuring device for measuring upon the finger a size of a ring that can be applied thereto in which there is eliminated the need for using several ring size devices to determine the ring size of the finger.

It is another object of the invention to provide a measuring device for a ring finger incorporating a wrap around element such as a chain on which the actual measurement of the ring or chain extended from the device can be determined and translated by the mechanism within the device; and wherein the ring size is determined from an indicating scale on the face of the device with an indicating arm extendable over the scale.

It is another object of the invention to provide a ring finger measuring device wherein the chain parts when not engaged around the finger, can be retracted into the device and protected while the device is being carried in the pocket of a jeweler.

Other objects of the invention are to provide a ring finger measuring device of the type described, which is of simple construction, has a minimum number of parts, light in weight, efficient and effective in use.

For a better understanding of the invention, reference is made to the following detailed description taken in connection with the accompanying drawings, in which:

FIG. 1 is a perspective view of the device applied to a ring finger, the measuring chain being extended.

FIG. 2 is an enlarged top plan view of the finger measuring device with chain thereof slightly extended.

FIG. 3 is a bottom plan view with portions broken away to show the actuation of the indicator arm.

FIG. 4 is a horizontal sectional view taken generally on line 4—4 of FIG. 6.

FIG. 5 is a top plan view of the device similar to FIG. 2, with the chain extended for measuring a finger size with a reading indicated upon the scale.

FIG. 6 is a vertical sectional view taken generally on line 6—6 of FIG. 5.

FIG. 7 is a reduced top plan view of another finger measuring device embodying another form of the invention.

FIG. 8 is a bottom plan view of the device of FIG. 7.

FIG. 9 is an enlarged top plan view of the device with top plate removed to show internal parts.

FIG. 10 is an enlarged top view similar to FIG. 7, showing the chain extended to form a finger loop, and the indicator arm located at the scale.

FIG. 11 and FIG. 12 enlarged are cross-sectional views taken on lines 11—11 and 12—12 respectively.

Referring first to FIGS. 1-6, the ring measuring device 10 includes a measuring chain 11 extended from the device and applied to a finger F on which it is desired to fit a ring. This measuring device 10 further comprises a casing having a bottom part 12 in which there is mounted for rotation a disc 13 to which the chain 11 is attached at one end. A top casing part 14 is secured to the bottom part by fastening screws 15 extending through holes in cylindrical walls or flanges 16 and 17 of the respective bottom and top parts 12 and 14. The disc 13 protrudes through hole 35 in annular bottom wall 12a of casing part 12, and is rested thereon by annular flange 18. The measuring chain 11 is anchored at one end to the flange by lug 19; see FIG. 4.

The upper part of the disc protrudes through hole 37 in the top wall 14a of casing part 14, and has a transverse or diagonally extending guide slot 21 for an upstanding knob or button 22 attached to a radially extending indicator arm 23 slidable in a radially extending slot or passage 24 located externally on the top of the upper casing wall 14a. This arm 23 has an opening 26 through which numerals 27 circumferentially inscribed on the top surface of the upper casing wall 14a can be viewed to determine the measured ring size and the size of the ring which will fit the finger F. On the outer periphery of the top casing wall 14a over which the arm 23 will rotate is a series of serrations or notches 28 with which a downwardly and inwardly bent pointed end 29 will register. The pointer engages in the serrations 28 and is retained in position as shown in FIG. 5 after the chain 11 and the measuring device 10 are slipped from finger F.

The tapered end 29 of the arm 23 is maintained in registry with the serrations 28 by a tension spring 31 connected at its inner end and anchored at its outer end in recess 32 in the disc.

The top casing part 14 may be split at line 33, FIG. 5, to facilitate the assembly of the casing part 14 into the bottom part 12. The chain 11 passes through an opening 34 in flanges 16, 17 and is anchored at its outer end to lug 36 at the exterior of the casing part 12, while permitting the chain to be adjusted in and out of the casing. The links can be pulled inwardly as shown in FIGS. 2, 3 and 4 by manipulating the arm 23 and the disc 13 to wind up the chain on the disc flange 18 as best shown in FIG. 4.

By pushing outwardly on the knob or button 22, the other end 29 of the arm 23 can be released from the serrations 28 and the round knob can then be turned with the thumb and finger to turn the disc and retract the chain through opening 34 in casing parts 12 and 14.

In use the chain can be similarly extended by unwinding the same from the flange 18 of the disc 13 and pulling out the chain to provide an adequate opening in the exterior chain 100P to accommodate the finger F. The chain will be again wound up and tightened on the finger by turning knob 22 so an indication can be given by the arm 23 of the size number 27 as these numbers appear in the window 26 of the arm 23. Thereafter the chain is slipped from the finger; however, the arm 23 is retained in place by the action of the spring 31 pulling inwardly upon the arm 23 and the engagement of pointed end 29 in serrations 28. Once the ring size is determined, the links exterior of the measuring device can be presented over a finger ring to determine the size of the ring that will fit the finger. In this manner the ring size can be determined if the ring is not marked with the size. Otherwise, a ring of known or marked size corresponding to the size indicated in window 26 can be selected.

FIGS. 7-12 show another finger measuring device 10A which is generally similar to device 10 and corresponding parts are identically numbered. In device 10A the top casing part 14' is flat annular flange which fits in bottom part 12'. A pair of radially extending lugs 40 are formed at the periphery of this flange and engage in notches 42 formed in the top of cylindrical casing wall 16a. A screw 44 extends through a hole 45 in flange 14' and is seated in threaded hole 46 formed in a lug 48 on the inside of casing wall 16a; see FIG. 12.

Chain 11 extends outwardly of hole 34a in casing wall 16a. The outer end of the chain is secured to lug 36a on the outside of wall 16a. The inside end of the chain is engaged on flange 18a of disc 13a. Scale lines 49 are inscribed on flange 14' with numbers 27a located at outer ends of the lines; see FIG. 10. A series of notches or serrations 28a are formed along the rim of hole 37a of flange 14'. Pointed tip 29a of arm 23a engages in these serrations. The arm is slidably disposed in a radial slot or passage 24a formed in a channel 50 which extends upwardly above the disc; see FIGS. 11, 12. The arm is urged radially outward by a compressed spring 31a in channel 50. Knob or button 22 is movable along guide slot 21a which communicates with passage 24a.

Chain 11 is extended outwardly to form a loop by turning disc 13a. This is done by turning knob 22. A pin 52 is further provided on top of the disc extending outwardly to assist in turning the disc if necessary. Spring 31a operates in a radial direction opposite to that of spring 31a in device 10 to urge the arm outwardly to the rim of hole 37a. The arm 23a engaged at one of the serrations 28a indicates the ring at one of the scale lines and numerals. In both devices 10 and 10A whole integers are marked on the top late of the device. These numerals are inscribed at alternate lines. Thus lines between numerals indicate half sizes.

After use the disc is turned to retract the chain. The device can then be placed in a jeweler's pocket where it will occupy very little space.

Both devices 10 and 10A make it unnecessary for a jeweler to provide himself with a large number of dummy rings, or other finger measuring devices. Just one measuring device as described herein will measure all finger sizes.

The parts of the devices described herein can be made of lightweight metal, metal or plastic. The devices can be made up in overall sizes no larger than a pocket watch or even smaller, so that they can be conveniently carried in a garment pocket.

What is claimed is:

1. A device for measuring a ring size of a finger comprising a cylindrical casing, a rotatable disc located in the casing, a link chain anchored at one end of the exterior of the casing, said casing having a lateral opening through which the links extend and surround the disc, said chain at its opposite end being anchored to the disc, whereby the finger can be inserted through the links extending outside of the casing, so that the chain can be drawn around the finger by turning the disc, wherein said casing has separable bottom and top parts, said disc extending through the bottom and top parts of the casing and journaled in the casing, said disc having a radial annular flange at the periphery of which the chain is engaged, wherein the disc extends axially exteriorly through the top part of the casing, wherein said disc has a radially extending passage, an indicator arm extending from the disc at the top of the casing, said arm being disposed radially of and parallel to the plane of the top disc face, said arm being longitudinally slidable in said passage, said arm having an end portion extending beyond the outer periphery of the casing and said arm being rotatable with the disc, and spring means carried by the disc and arranged to maintain and urge the end portion of the arm inwardly against the periphery of the casing.

2. A device for measuring a ring size of a finger as defined in claim 1, wherein the top part of the casing is inscribed with ring size numbers extended circumferentially thereover, said arm having a window through which the ring size numbers are individually exposed.

3. A device for measuring a ring size of a finger as defined in claim 2, said end portion of the arm being pointed, said top part of the casing having serrations on its periphery adjacent to the ring size numbers, said spring means urging the pointed end of the arm into the serrations of the top part of the casing.

4. A device for measuring ring size of a finger as defined in claim 3, wherein said disc has a radial guide slot communicating with the passage in which said arm slides, and a knob extending upwardly from the arm and through the guide slot, so that the pointed end of the arm can be released from the serrations and the disc turned by moving the knob along the radial guide slot.

5. A device for measuring the ring size of a finger as defined in claim 1, wherein said disc has a radially extending passage, said top part of the casing having a series of serrations at its periphery, said arm having a pointed end and being longitudinally slidable in said passage to engage said serrations selectively, and spring means in said passage urging the arm radially outward to engage the pointed end of the arm in said serrations.

6. A device as defined in claim 5, wherein said top part of the casing is inscribed with a scale having graduations and numerals indicative of ring sizes.

7. A device as defined in claim 6, further comprising a knob extending upwardly from said arm for retracting the same against tension in said spring and for turning the disc.

* * * * *